(12) United States Patent
Reid

(10) Patent No.: US 9,266,761 B2
(45) Date of Patent: Feb. 23, 2016

(54) ANAEROBIC LAGOON OR TANK HAVING A FLOW-SPLITTER TANK

(71) Applicant: John H. Reid, Fredericksburg, VA (US)

(72) Inventor: John H. Reid, Fredericksburg, VA (US)

(*) Notice: Subject to any disclaimer, the term of this patent is extended or adjusted under 35 U.S.C. 154(b) by 301 days.

(21) Appl. No.: 13/907,534

(22) Filed: May 31, 2013

(65) Prior Publication Data
US 2013/0327708 A1 Dec. 12, 2013

Related U.S. Application Data (63) Continuation-in-part of application No. 13/494,690, filed on Jun. 12, 2012, now Pat. No. 9,005,442.

(51) Int. Cl.
*C02F 3/28* (2006.01)

(52) U.S. Cl.
CPC ............. *C02F 3/2866* (2013.01); *C02F 3/28* (2013.01); *C02F 2209/40* (2013.01); *Y02E 50/343* (2013.01); *Y02W 10/12* (2015.05)

(58) Field of Classification Search
CPC ...... C02F 3/2866; C02F 3/28; C02F 2209/40; Y02E 50/343; Y02W 10/12
USPC .................................. 210/603, 252, 253, 259
See application file for complete search history.

(56) References Cited

U.S. PATENT DOCUMENTS

| | | | | |
|---|---|---|---|---|
| 3,300,404 A | * | 1/1967 | Howe et al. | 210/610 |
| 3,617,539 A | * | 11/1971 | Grutsch et al. | 210/608 |
| 4,948,510 A | * | 8/1990 | Todd et al. | 210/605 |
| 5,252,214 A | * | 10/1993 | Lorenz | C02F 3/1215 210/605 |
| 5,338,452 A | * | 8/1994 | Pidaparti | C02F 3/28 210/188 |
| 7,468,133 B1 | * | 12/2008 | Norton | 210/603 |
| 2004/0011734 A1 | * | 1/2004 | Cha et al. | 210/603 |

* cited by examiner

*Primary Examiner* — Fred Prince
(74) *Attorney, Agent, or Firm* — Walter Ottesen P.A.

(57) ABSTRACT

An anaerobic lagoon wastewater treatment system has a flow-splitter tank for accurately dividing a flow of raw, untreated wastewater. The system is designed as an earthen basin or as a tank and includes at least one partitioning element for providing two connected wastewater treatment zones. The first wastewater treatment zone in the direction of wastewater flow has a larger volume and is more efficient in the removal of biological oxygen demand (BOD) than the second wastewater treatment zone. The flow-splitter tank divides the incoming wastewater flow into two streams, which are conducted to the first and second wastewater treatment zones, respectively. A predetermined ratio of carbon to nitrogen is maintained within an effluent pumped from the second wastewater treatment zone by adjusting the relative amount of raw wastewater added directly to the second wastewater treatment zone.

18 Claims, 9 Drawing Sheets

FIG. 9B

ANAEROBIC LAGOON OR TANK HAVING A FLOW-SPLITTER TANK

CROSS REFERENCE TO RELATED APPLICATION

This application is a continuation-in-part of U.S. patent application Ser. No. 13/494,690, filed Jun. 12, 2012, the entire content of which is incorporated herein by reference.

FIELD OF THE DISCLOSURE

An anaerobic lagoon biological wastewater treatment system is provided that allows to control the carbon to nitrogen ratio, or biological oxygen demand (BOD) to total Kjeldahl nitrogen (TKN) ratio, of the wastewater treated by and discharged from the wastewater treatment system.

BACKGROUND

Anaerobic Lagoons (ALs) are typically earthen basins filled with wastewater, which undergoes anaerobic respiration as part of a system designed to manage and treat wastewater from poultry slaughter houses. Once in the lagoon, wastewater undergoes, among other reactions, the process of anaerobic respiration, whereby volatile organic compounds are converted into carbon dioxide and methane. ALs are typically operated on a five day per week schedule, with little or no production of wastewater over weekends and on holidays.

Anaerobic Lagoons are designed to provide BOD, Total Suspended Solids (TSS), and Fat, Oil and Grease (FOG) removal. The anaerobic biological treatment process typically provides approximately 70% to 90% BOD removal, 80% to 90% FOG removal, and reduces TSS concentrations down to 100 to 300 mg/L. By contrast, the AL process provides only minimal TKN and Total Phosphorous (TP) nutrient removal of about 5% to 15%. Consequently, a typical AL design providing 80% BOD and 10% TKN removal results in AL effluent with a BOD/TKN ratio below 1. However, a BOD/TKN of 3.0 or higher is normally required to achieve efficient nitrate nitrogen removal by biological denitrification in a downstream activated sludge treatment process. Accordingly, existing AL technology is problematic in that ALs remove most of the BOD to generate biogas but remove very little nitrogen causing the typically very low AL effluent BOD/TKN ratio.

More recent AL designs have used influent short circuiting or partial AL bypassing to attempt to raise the AL effluent BOD concentration and BOD/TKN ratio of the AL effluent wastewater or the downstream process blend effluent wastewater. Influent short circuiting is accomplished by use of an alternate AL influent pipeline, which can discharge a controlled portion of the total influent flow volume into the outlet end of the AL in order to allow for FOG and TSS removal from the short circuited portion of the wastewater while significantly reducing the removal of soluble and colloidal BOD from the short circuited wastewater. Influent short circuiting produces a treated wastewater blend that has a higher BOD concentration, and, therefore, a higher BOD/TKN ratio to provide an adequate BOD carbon source for efficient biological denitrification in a downstream activated sludge treatment process.

The short circuit design or the partial bypass design, however, are not always effective, especially on weekends or holidays when a processing plant is typically not in operation, and, therefore there is no wastewater to short-circuit to the outlet end of the AL or to bypass the AL. Consequently, even when the short circuit AL lagoon design or AL lagoon bypass design is used, the blended AL effluent wastewater BOD is significantly decreased on weekends and holidays, when there is no influent wastewater flow because the processing plant is not in operation.

SUMMARY OF THE DISCLOSURE

Disclosed herein is a biological wastewater treatment system which comprises an anaerobic lagoon and/or a anaerobic wastewater treatment tank having a flow-splitter tank for accurately dividing an incoming flow of raw, untreated wastewater.

In one aspect of the disclosure, an anaerobic lagoon wastewater treatment system is provided, which comprises an anaerobic lagoon; a partition element positioned within the anaerobic lagoon to define a high biological oxygen demand (BOD) removal efficiency wastewater treatment zone and a low BOD removal efficiency wastewater treatment zone; and a flow splitter tank; wherein the flow splitter tank divides a flow of raw wastewater into a first wastewater flow being conducted to the high BOD removal efficiency wastewater treatment zone and a second wastewater flow being conducted to the low BOD removal efficiency wastewater treatment zone.

In another aspect of the disclosure, a method of controlling an effluent carbon to nitrogen ratio of an anaerobic lagoon is provided, which comprises providing an anaerobic lagoon; positioning a partition element within the anaerobic lagoon to define a high biological oxygen demand (BOD) removal efficiency wastewater treatment zone and a low BOD removal efficiency wastewater treatment zone; dividing a wastewater influent in a flow splitter tank into a first wastewater flow and a second wastewater flow; and, conducting the first wastewater flow into the high BOD removal efficiency wastewater treatment zone and the second wastewater flow into the low BOD removal efficiency wastewater treatment zone to adjust a ratio of effluent carbon to nitrogen at an exit port of the anaerobic lagoon.

BRIEF DESCRIPTION OF THE DRAWINGS

The invention will now be described with reference to the drawings wherein.

DESCRIPTION OF THE BEST AND VARIOUS EMBODIMENTS

The foregoing and other objects, aspects, and advantages will be better understood from the following detailed description of the best and various embodiments. Throughout the various views and illustrative embodiments of the present disclosure, like reference numbers are used to designate like elements.

The anaerobic lagoon wastewater treatment system disclosed herein comprises at least one portioning element and a flow-splitter tank. The portioning element divides the anaerobic lagoon into two wastewater treatment zones, a high BOD removal efficiency wastewater treatment zone and a low BOD removal efficiency wastewater treatment zone, wherein the latter has a smaller volume, and, therefore, shorter retention time, for treating wastewater.

In a typical embodiment, the low BOD removal efficiency wastewater treatment zone is located adjacent to an exit port of the anaerobic lagoon. In another typical embodiment, the partition element has a plurality of flow holes in a vicinity of a lagoon bottom so that a liquid level is essentially the same on both sides of the partition element.

In another typical embodiment, wastewater flows from the high BOD removal efficiency wastewater treatment zone through the plurality of flow holes into the low BOD removal efficiency wastewater treatment zone.

In yet another typical embodiment, the anaerobic lagoon wastewater treatment system further comprises a biogas containment cover. With particularity, the anaerobic lagoon wastewater treatment system comprises one partition element.

Also with particularity, a further partition element is provided for dividing the low BOD removal efficiency wastewater treatment zone into a first low BOD removal efficiency wastewater treatment zone and a second low BOD removal efficiency wastewater treatment zone. Typically, the first low BOD removal efficiency wastewater treatment zone and the second low BOD removal efficiency wastewater treatment zone are connected in series. In another typical embodiment, the first low BOD removal efficiency wastewater treatment zone and the second low BOD removal efficiency wastewater treatment zone are connected in parallel.

In a typical embodiment, a method is provided, which comprises adjusting a ratio of the first wastewater flow to the second wastewater flow to maintain a predetermined ratio of effluent carbon to nitrogen at the exit port of the anaerobic lagoon. In another typical embodiment, a plurality of flow holes is provided in a vicinity of a lagoon bottom. In yet another typical embodiment the high BOD removal efficiency wastewater treatment zone has a larger volume than the low BOD removal efficiency wastewater treatment zone.

Typically, a first wastewater detention time for the high BOD removal efficiency wastewater treatment zone and a second wastewater detention time for the low BOD removal efficiency wastewater treatment zone are provided, wherein the first wastewater detention time is about four to ten times longer than the second wastewater detention time. Also typically, the first wastewater detention time is about two days to twenty days and the second wastewater detention time is about twelve hours to two days.

In a particular embodiment, the BOD concentration of the wastewater in the high BOD removal efficiency wastewater treatment zone is reduced by about 70% to 80%. In another particular embodiment, the predetermined ratio of effluent carbon to nitrogen is at least 4:1. In yet another particular embodiment, the ratio of effluent carbon to phosphorus at the exit port of the anaerobic lagoon is at least 20:1. In a typical embodiment, the effluent at the exit port has a carbon to nitrogen ratio of approximately 4:1 and a carbon to phosphorous ratio of approximately 20:1.

Moreover, in one aspect of the disclosure, an anaerobic lagoon wastewater treatment system is provided that comprises an anaerobic lagoon or a tank, a partitioning element positioned within the anaerobic lagoon or the tank to define a plurality of wastewater treatment zones, and a first effluent pipeline for transporting an effluent from a first wastewater treatment zone from among the plurality of wastewater treatment zones to an outlet end of the anaerobic lagoon or an outlet end of the tank.

In a further aspect of the disclosure, an anaerobic lagoon wastewater treatment system is provided that comprises a plurality of anaerobic lagoons, a first pipeline for connecting a first anaerobic lagoon to a final anaerobic lagoon from among the plurality of anaerobic lagoons, and a second pipeline to transporting an effluent from the first anaerobic lagoon to an outlet end of the final anaerobic lagoon.

In yet another aspect of the disclosure, a method of controlling an effluent carbon to nitrogen ratio and/or carbon to phosphorus ratio of an anaerobic lagoon is provided, which comprises providing an anaerobic lagoon, a tank or an anaerobic lagoon and/or a tank having a plurality of wastewater treatment zones; reducing an initial biological oxygen demand (BOD) concentration to a first BOD concentration in the first wastewater treatment zone from among the plurality of wastewater treatment zones; reducing the first BOD concentration to a second BOD concentration in a final wastewater treatment zone from among the plurality of wastewater treatment zones; wherein a difference in concentration between the initial BOD concentration and the first BOD concentration is smaller than the difference in concentration between the first BOD concentration and the second BOD concentration; and mixing a first effluent from the first wastewater treatment zone with a second effluent from the final wastewater treatment zone and/or conducting the first effluent into the final wastewater treatment zone, or conducting the first effluent directly to a downstream activated sludge denitrification reactor in a nitrification-denitrification biological nitrogen and phosphorous removal system.

Further, the disclosed anaerobic lagoon systems provide for one or more influent zone cells or effluent zone cells in which only a low percentage of BOD removal occurs in the wastewater. Wastewater can be pumped or discharged at a controlled flow rate and volume from one of these "high BOD" cells to mix with wastewater pumped or discharged from the effluent or outlet end of the AL to produce a blended total effluent flow volume with higher BOD/TKN ratio. This AL design provides for much more accurate control of AL BOD/TKN ratio over the entire 7 day/week time period because the BOD concentration in the effluent zone or "high BOD" cell will drop or be reduced much less than in the outlet zone of the AL over weekends or holidays, thereby allowing the blended final AL effluent to maintain a higher BOD concentration and BOD/TKN ratio.

The anaerobic lagoon biological wastewater treatment system disclosed herein comprises a plurality of wastewater treatment zones, i.e., two or more wastewater treatment zones. In a preferred embodiment, the plurality of wastewater treatment zones are provided as partitions of a common anaerobic lagoon, which are formed by one or more partitioning elements located within the lagoon. In another preferred embodiment, the plurality of wastewater treatment zones corresponds to a plurality of anaerobic lagoons, which are connected in series. In a further embodiment, two or more wastewater treatment zones are provided as partitions of a tank.

The first wastewater treatment zone is provided as a wastewater influent zone and receives the wastewater to be treated. In a typical embodiment, wastewater enters the first wastewater treatment zone through a wastewater intake port and an effluent exits a final wastewater treatment zone through an anaerobic lagoon outlet.

With particularity, the first wastewater treatment zone has a smaller volume than the final wastewater treatment zone. Also with particularity, the partitioning element has a plurality of flow holes in a vicinity of a lagoon bottom, which allows wastewater to flow from a wastewater treatment zone into an adjacent wastewater treatment zone, such that a liquid level is substantially the same on both sides of the partitioning element.

In a typical embodiment, the anaerobic lagoon wastewater treatment system further comprises a biogas containment cover. In another typical embodiment, the anaerobic lagoon further comprises a biogas collection system.

In a particular embodiment, the anaerobic lagoon comprises one partitioning element to define the first wastewater treatment zone and the final wastewater treatment zone. In another particular embodiment, the anaerobic lagoon comprises two partitioning elements to define the first wastewater treatment zone, a second wastewater treatment zone, and the final wastewater treatment zone.

Typically, the plurality of anaerobic lagoons further comprises a second effluent pipeline for transporting an effluent from the second wastewater treatment zone to the outlet end of the anaerobic lagoon.

Also typically, the partitioning element is selected from the group consisting of a concrete wall, a floating, optionally movable, cable-mounted membrane, and a fixed cable-mounted membrane.

In a particular embodiment, the partition is movable to allow for adjusting of the volume of an adjacent wastewater treatment zone. Specifically, if only the first partition is moved towards the wastewater inlet, the volume of the first wastewater treatment zone is reduced while the volume of the second or final wastewater treatment zone is increased. Accordingly, the volume of the second wastewater treatment zone may be adjusted by moving the first and/or the second partition.

With particularity, the plurality of anaerobic lagoons comprises a biogas containment cover. Typically, each lagoon comprises a separate biogas containment cover, which may be provided as a single containment cover covering the entire lagoon. Also typically, the plurality of lagoons comprises a biogas collection system.

In a typical embodiment, the amount of the first effluent is adjusted to maintain a predetermined ratio of effluent carbon to nitrogen and/or effluent carbon to phosphorous downstream. In another typical embodiment, a first wastewater detention time and volume are selected for the first wastewater treatment zone and a final wastewater detention time and volume are selected for the final wastewater treatment zone, wherein the final wastewater detention time is about four to ten times longer than the first wastewater detention time. With particularity, the first wastewater detention time is of from about twelve hours to about two days, more particularly about one day, and the final wastewater detention time is of from about two days to about twenty days, more particularly about ten days.

In a particular embodiment, the BOD concentration of the wastewater in the first wastewater treatment zone is reduced by about 20% to 30%. In another particular embodiment, a first volume of the first wastewater treatment zone is of from about 10 to 20% of a total volume of the plurality of wastewater treatment zones and a second volume of the second wastewater treatment zone is of from about 80 to 90% of a total volume of the plurality of wastewater treatment zones. In a further particular embodiment, the predetermined ratio of effluent carbon to nitrogen is at least 4:1. In yet another particular embodiment, the ratio of effluent carbon to phosphorus is at least 20:1. In a typical embodiment, the effluent at the exit port has a carbon to nitrogen ratio of approximately 4:1 plus a carbon to phosphorous ratio of approximately 20:1.

Figure 1:
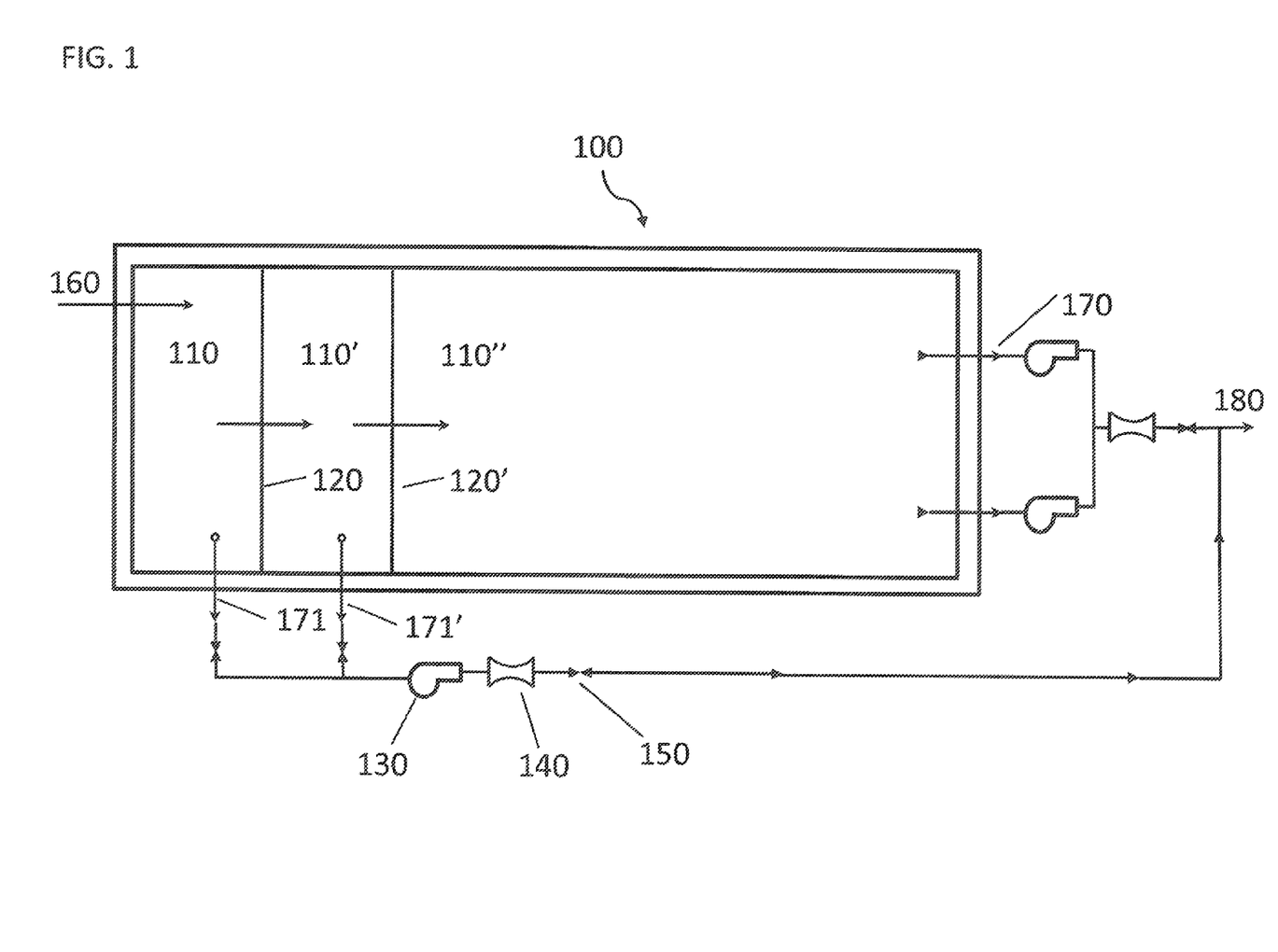
FIG. 1 depicts a plan view of anaerobic lagoon 100, which includes two partitioning elements 120 and 120'. The two partitioning elements 120 and 120' divide the interior space of the anaerobic lagoon into three wastewater treatment zones 110, 110', and 110"

Turning to the drawings, FIG. 1 shows a preferred embodiment of an anaerobic lagoon 100 provided with partitioning elements 120 and 120', which divide the lagoon interior into three wastewater treatment zones, in particular into first wastewater treatment zone 110, second wastewater treatment zone 110', and final wastewater treatment zone 110". It is within the scope of this disclosure to provide at least one partitioning element to partition a lagoon into two wastewater treatment zones, but there is no particular limit on the number of partitioning elements that may be provided and, thus, on the number of partitions created.

The multiple wastewater treatment zones or cell partitions are designed to provide segregation of AL zones. The partitioning elements or partitions have flow holes near the lagoon bottom to allow wastewater to pass from one zone into the next zone. The partitions therefore can be, but must not necessarily be, designed structurally to retain hydraulic pressure or to allow the side of the partition to be drained while the other side is full or not drained. The partitioning element may, therefore, be a concrete wall provided within the lagoon or preferably a floating membrane partition constructed of the same type of membrane material as the lagoon liner or the lagoon biogas cover. Further, this disclosure is not limited to the above listed materials for a partitioning element. Rather, any structure capable of partitioning the lagoon interior may be used.

In one aspect of the disclosure, an existing anaerobic lagoon is converted into an anaerobic lagoon capable of maintaining an effluent carbon to nitrogen ratio by installing a partition element within the existing lagoon, such as by pouring a concrete wall. In another aspect of the disclosure, an existing tank is converted by providing a partition, such as a floating cable-mounted membrane, inside of the tank. It is further possible to adjust the respective volumes of the wastewater treatment zones created by the installation of the partition or partitions by providing movable partitions.

Wastewater that has been partially treated flows from the first wastewater treatment zone 110 through the flow holes near the bottom of partitioning element 120 into the second wastewater treatment zone 110'. After further treatment, wastewater flows into the final wastewater treatment zone 110".

Wastewater enters the first wastewater treatment zone of lagoon 100 through wastewater intake port 160. The first and second wastewater treatment zones 110 and 110' are operated as high BOD cells, i.e., wastewater treatment zone containing wastewater having a high BOD concentration, by shortening the detention time of wastewater therein compared to the detention time typically used for wastewater in a lagoon of the size of the entire lagoon 100. The shorter detention time prevents the markedly reduction in BOD concentration that is achievable in an undivided lagoon undergoing prolonged anaerobic treatment. One or more high BOD cells can be used. Typically, 50% to 80% TSS and Oil and Grease removal occurs in the high BOD cells, while a much lower BOD removal yield of approximately 20% to 30% occurs due to the reduced volume and detention time in the High BOD cell(s). Partially treated wastewater can be pumped out of wastewater treatment zones 110 and 110' through effluent lines 171 and 171', respectively, using pump 130. The effluent flow rate is measured with flow meter 140. Further, the effluent line includes valve 150.

The high BOD effluent from either or both of wastewater treatment zones 110 and 110' is mixed downstream of the final wastewater treatment zone 110" with a low BOD effluent obtained from the final wastewater treatment zone 110" through effluent line 170. The mixture of low and high BOD is transported for further treatment as mixture effluent 180.

Providing two wastewater treatment zones as high BOD cells allows to more accurately adjust the BOD/nitrogen ratio and BOD/phosphorous ratio downstream of the final wastewater treatment zone.

Figure 2:
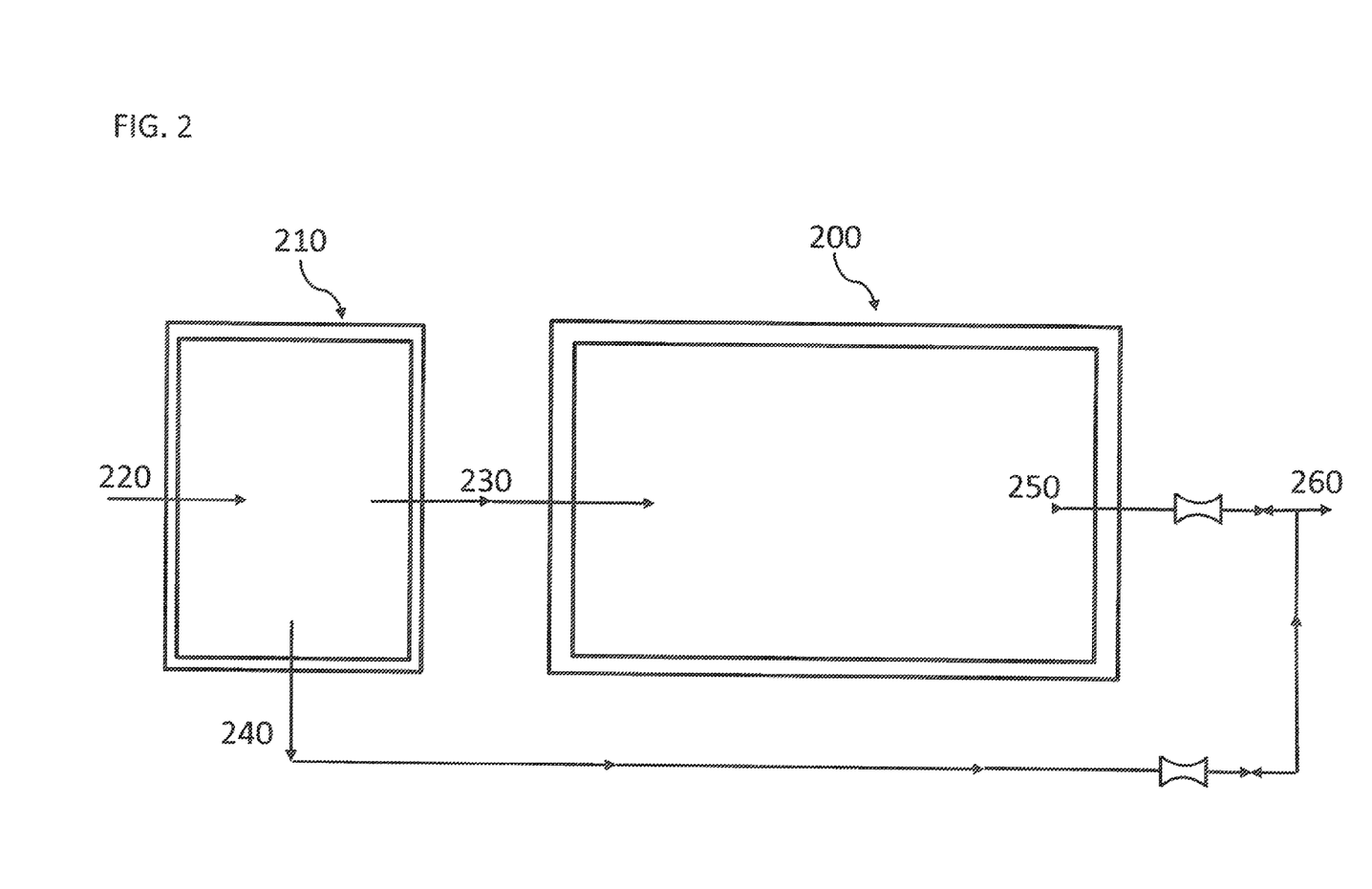
FIG. 2 depicts anaerobic lagoons 200 and 210, whereby anaerobic lagoon 210 is provided upstream of anaerobic lagoon 200. Further, anaerobic lagoon 210 is smaller than anaerobic lagoon 200, i.e., has a smaller volume for receiving and storing wastewater.

FIG. 2 shows another preferred embodiment of an anaerobic lagoon having a plurality of wastewater treatment zones. In this case, the separate wastewater treatment zones are not provided as partitions of a common lagoon, but as separate lagoons connected by wastewater-carrying lines, such as pipelines or troughs. Specifically, anaerobic lagoon 210 is provided upstream of anaerobic lagoon 200 and is operated as a first wastewater treatment zone, i.e., as a high BOD cell. Wastewater to be treated enters anaerobic lagoon 210 through influent port 220 and undergoes anaerobic treatment. The volume of anaerobic lagoon 210 is smaller than the volume of anaerobic lagoon 200, which results in a shorter average detention time for wastewater in anaerobic lagoon 210. Consequently, only about 20 to 30% BOD removal occurs in the first anaerobic lagoon. Partially treated wastewater leaves anaerobic lagoon 210 as effluent 230 and is conducted into anaerobic lagoon 200, which is operated as a final wastewater treatment zone. Anaerobic lagoon 200 has a larger volume and, therefore, a longer average wastewater detention time and higher BOD removal yield to achieve a low BOD concentration.

After anaerobic treatment, wastewater leaves anaerobic lagoon 200 as effluent 250 and is mixed with effluent 240, which is obtained from anaerobic lagoon 210 directly. The mixture of effluent 240 and effluent 250 is conducted to a further wastewater treatment process as partially treated wastewater 260.

More than one anaerobic lagoon 210 may be provided upstream of anaerobic lagoon 200. If more than one anaerobic lagoon 210 is provided, the anaerobic lagoons are connected in series and each anaerobic lagoon comprises an effluent line for mixing an effluent downstream of the anaerobic lagoon 200. However, due to space restrictions at the site of the wastewater treatment facility, typically only one anaerobic lagoon 210 is provided.

It is one aspect of the disclosure to install a smaller lagoon upstream of an existing anaerobic lagoon of a wastewater treatment facility to convert the existing anaerobic lagoon of the facility into an anaerobic lagoon system capable of maintaining an effluent carbon to nitrogen ratio.

Further, it is within the scope of this disclosure to provide an anaerobic lagoon system that comprises a plurality of anaerobic lagoons and a partitioning element. In one preferred embodiment, a small anaerobic lagoon is provided upstream or downstream of a larger anaerobic lagoon, wherein the small anaerobic lagoon additionally contains a partitioning element. Two effluent lines are provided to transport an effluent from each wastewater treatment zone created by the partitioning element within the small anaerobic lagoon.

Figure 3:
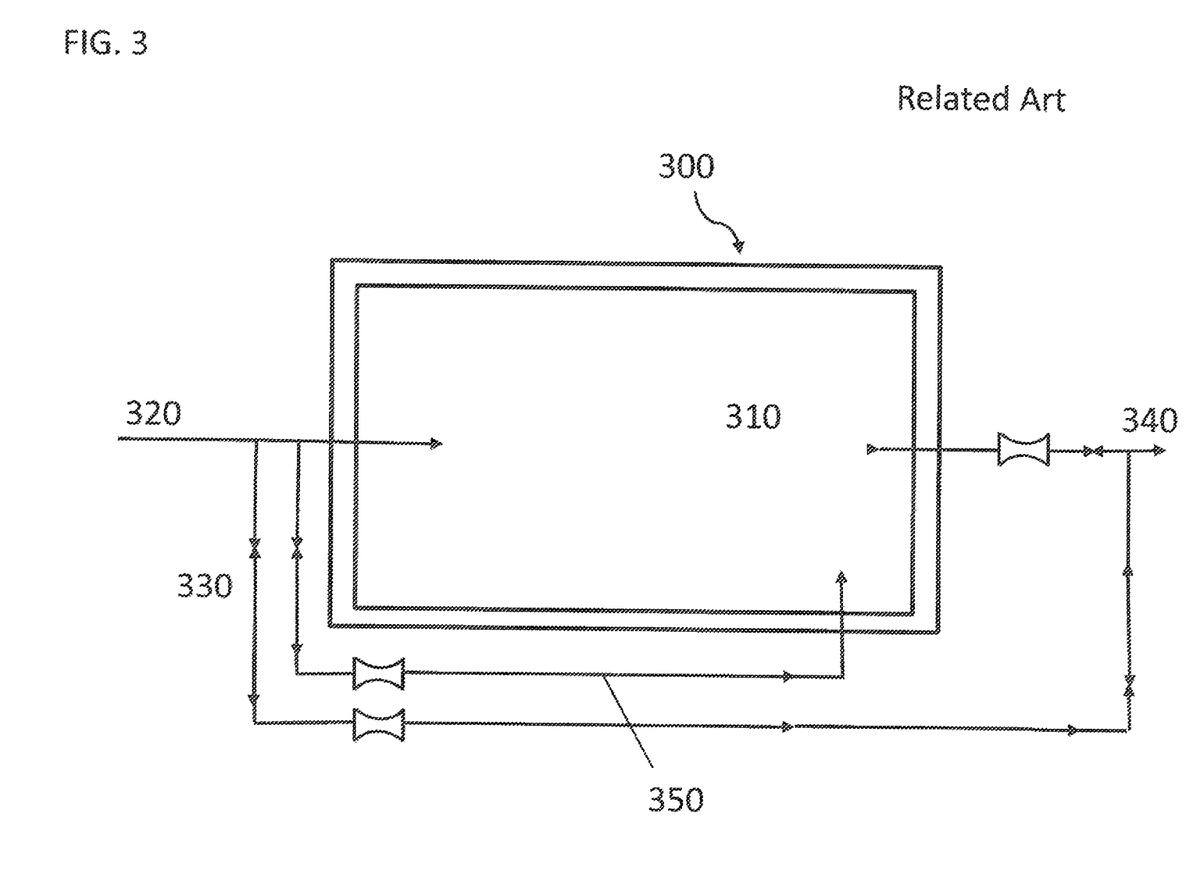
FIG. 3 depicts an anaerobic lagoon 300 from the related art, which includes short-circuit line 350 and bypass line 330.

FIG. 3 shows an anaerobic lagoon of the related art. A wastewater stream 320 enters a single anaerobic treatment cell 310 within anaerobic lagoon 300. The wastewater stream 320 may be partially diverted through bypass line 330 or short-circuit line 350 and mixed with an effluent from anaerobic lagoon 300 to obtain partially treated wastewater 340.

Figure 4:
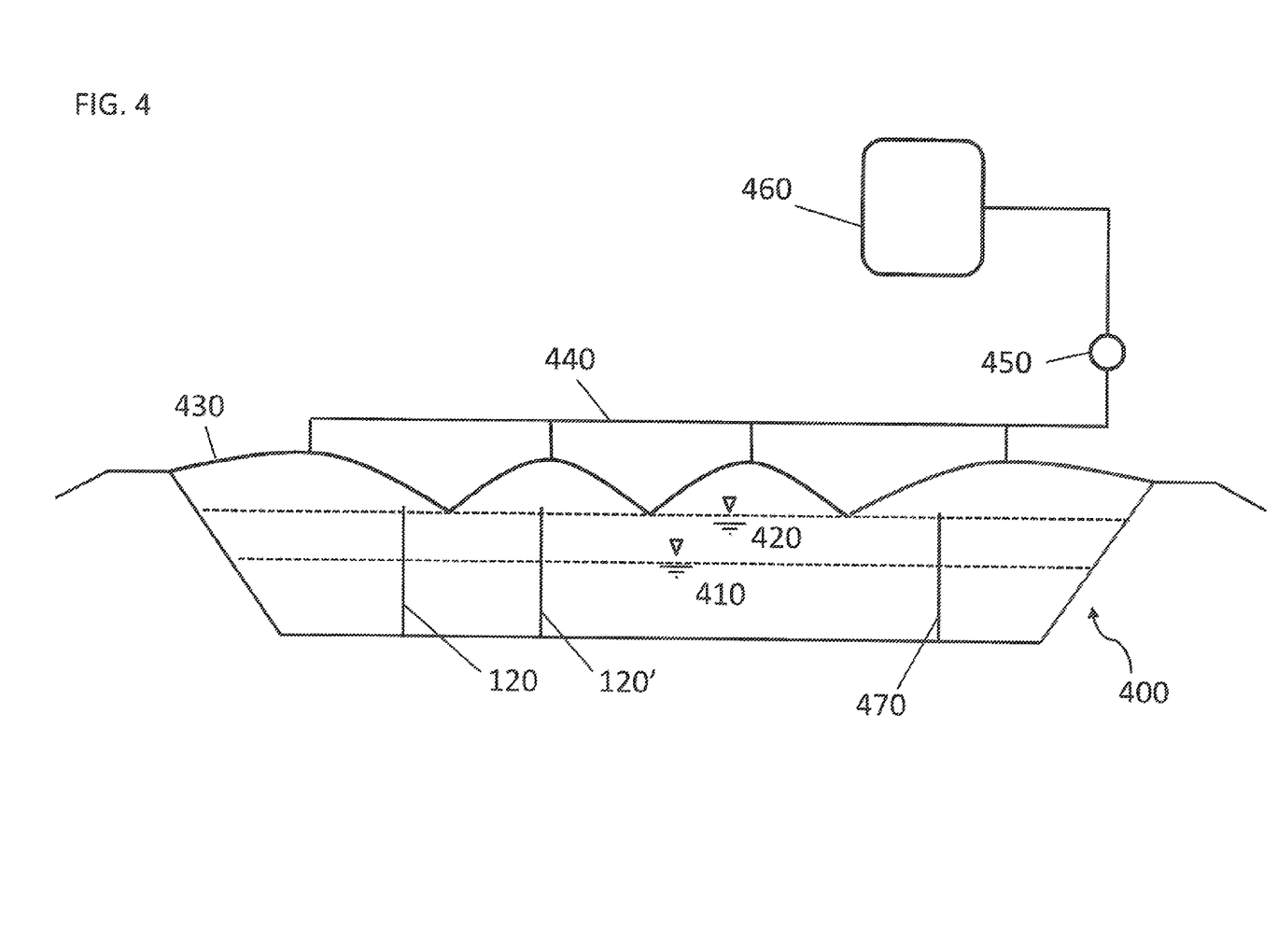
FIG. 4 depicts a section view of anaerobic lagoon 400, which includes gas containment and collection cover 430.

FIG. 4 shows a section view of a preferred embodiment of an anaerobic lagoon 400 comprising two partitioning elements 120 and 120'. The wastewater is retained within the lagoon at a fill level that is located of from low water mark 410 and up to high water mark 420. The anaerobic lagoon is covered with a biogas containment cover 430. Biogases, such as methane, which are produced in the biological anaerobic treatment process, are prevented from escaping the water treatment facility, which otherwise could constitute a nuisance to neighboring residents. Moreover, the biogases can be collected to either be used as a biofuel on site or sold. The biogases flow through pipe 440 and are compressed by pump 450 to be stored in gas storage tank 460. In addition, anaerobic lagoon 400 may be provided with optional partitioning element 470 to create a downstream wastewater treatment zone.

Figure 5:
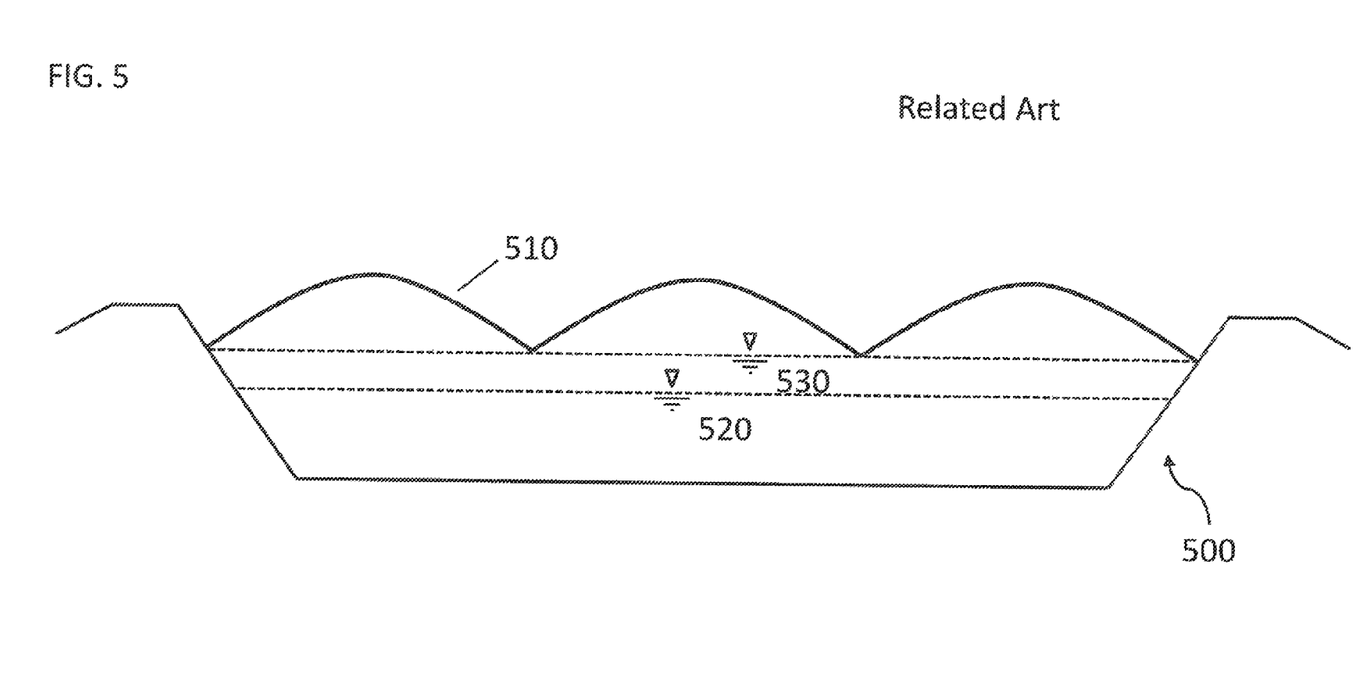
FIG. 5 depicts related art anaerobic lagoon 500, which includes gas containment and collection cover 510.

FIG. 5 shows an anaerobic lagoon 500 of the related art, which is covered with a biogas containment cover 510. Wastewater is retained within the lagoon at a fill level which is between low water mark 520 and high water mark 530.

Accordingly, the design of anaerobic lagoon 400 provides for biogas containment, collection, and recycling using a single cover system because the partitioning elements do not separate the gas space above the lagoon variable liquid level. By contrast, for a plurality of separate anaerobic lagoons, each anaerobic lagoon is typically covered with a biogas containment cover if biogases are collected and reused as a fuel source. Thus, biogas containment and collection for an anaerobic lagoon design with two separate lagoons and two separate cover systems is typically more expensive than biogas containment for a single anaerobic lagoon with partitioning elements, which can be achieved with a single cover system.

Figure 6:
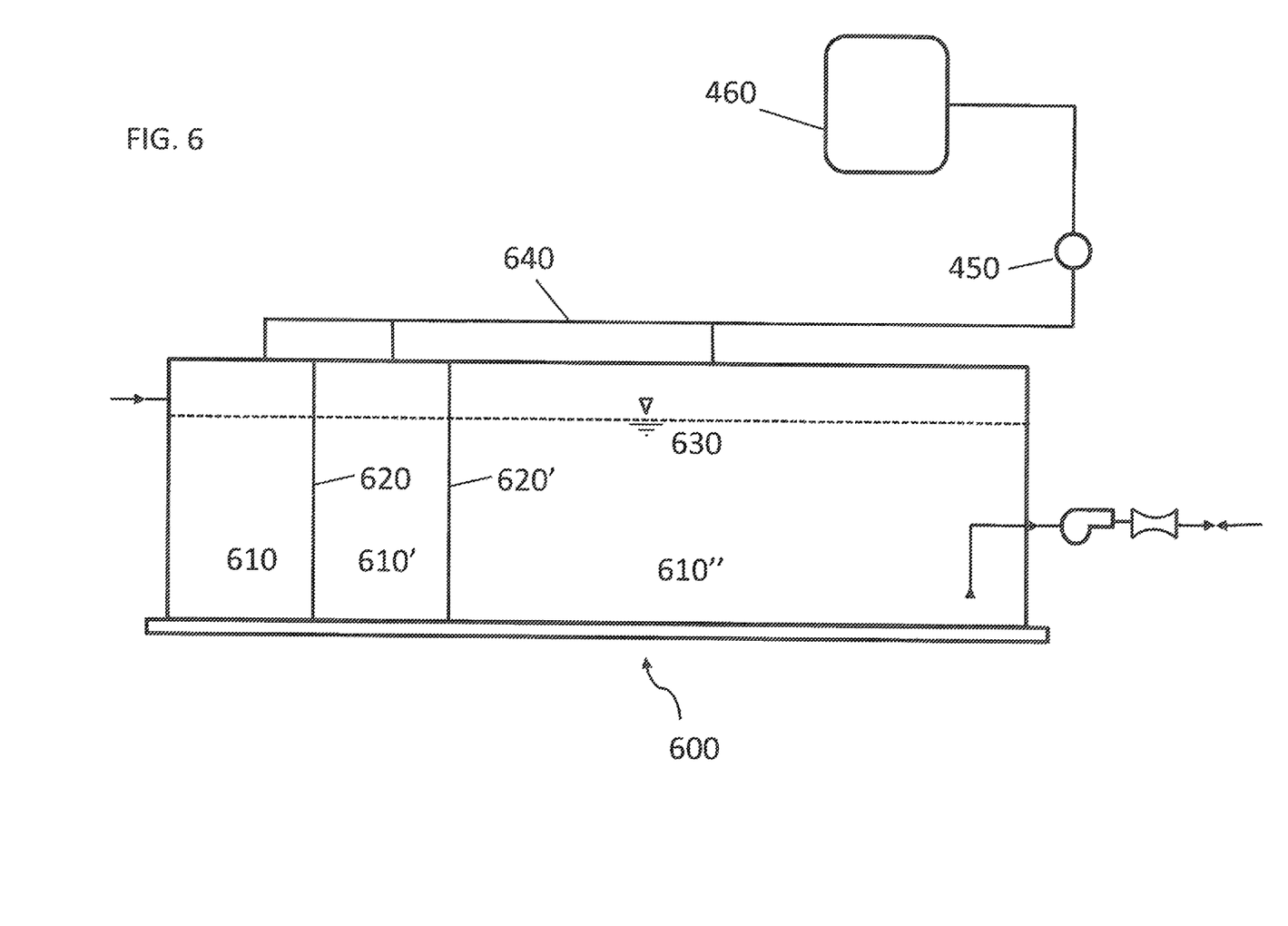
FIG. 6 depicts a section view of a wastewater treatment system in which the wastewater treatment zones are provided by installing partitions 620 and 620' within tank 600.

FIG. 6 shows a section view of an anaerobic wastewater treatment system wherein the treatment takes place in a tank 600 instead of an anaerobic lagoon, as discussed above. The tank is provided with two partitions 620 and 620' to create a total of three wastewater treatment zones, in particular first wastewater treatment zone 610, second wastewater treatment zone 610', and final wastewater treatment zone 610". Wastewater can flow through an opening near the bottom of the partitions into an adjacent wastewater treatment zone. Further, the tank is provided with a biogas cover and a collection line 640 for biogases accumulating within the tank 600. Wastewater can be brought into the tank up to a maximum fill height 630 leaving a head space above the wastewater treatment zones.

Size and shape of the tank 600 are not particularly limited. However, in a preferred embodiment, tank 600 is made from concrete. Further, tank 600 is provided as an above grade installation. However, it is also possible to install tank 600 partially or fully below grade. Moreover, the tank can be provided having an open top or as a covered tank.

Figure 7:
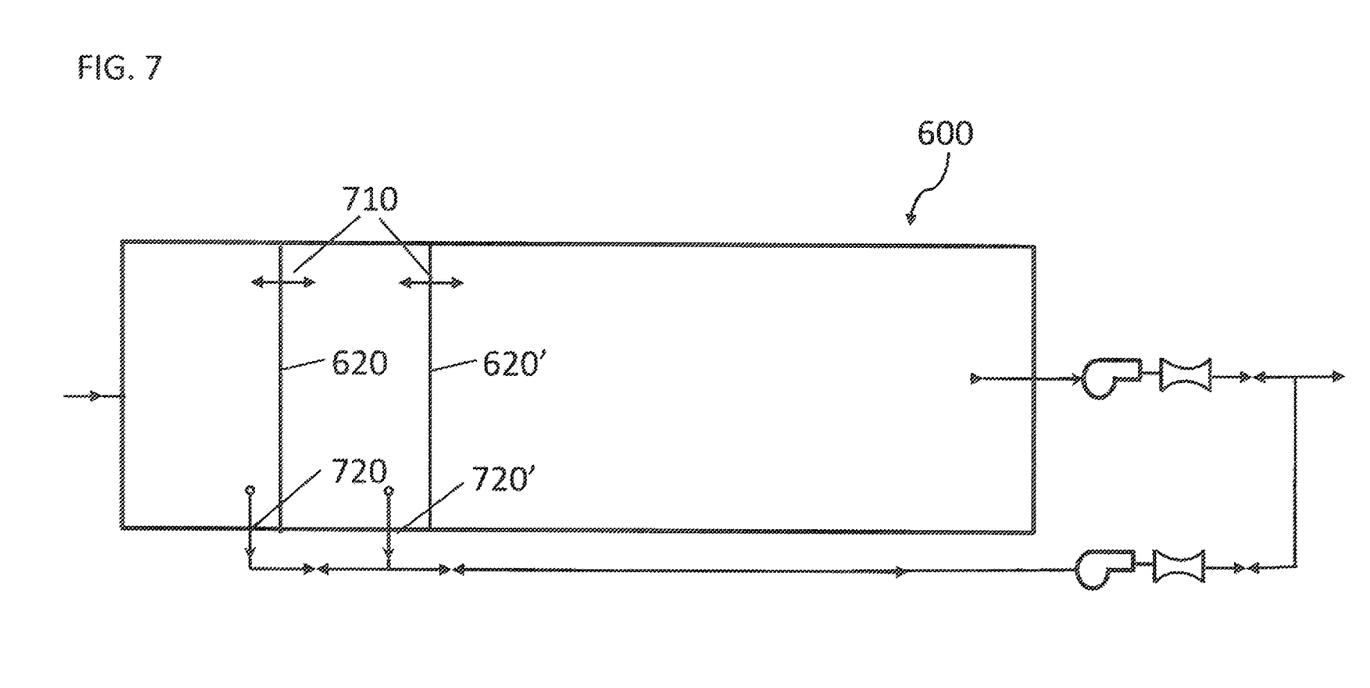
FIG. 7 depicts a plan view of the wastewater treatment tank 600 in which an effluent can be directly withdrawn from the high BOD cells through bypass lines 720 or 720'.

FIG. 7 depicts a plan view of the wastewater treatment system in FIG. 6. The first two wastewater treatment zones are operated as high BOD cell. From the first and second wastewater treatment zones partially treated wastewater can be conducted through bypass lines 720 and 720', respectively, to be mixed with an effluent pumped from the final wastewater treatment zone 610" to adjust the effluent carbon to nitrogen and/or carbon to phosphorous ratio.

Further, as depicted in FIG. 7, the volumes of the wastewater treatment zones are adjustable because the partitions are movable in the direction indicated by arrows 710.

In another preferred embodiment, the anaerobic lagoon is designed and operated to provide a relatively constant equalized flow. Specifically, the volume of the anaerobic lagoon is sufficient to store wastewater inflow over a prolonged period, such as 7 days, while the effluent output is kept constant. Moreover, if the facility producing wastewater is in operation for less than 7 days per week, for example for 5 days per week, the equalized flow at the outlet end of the anaerobic lagoon is set to approximately 5/7 times the daily inflow.

Figure 8:
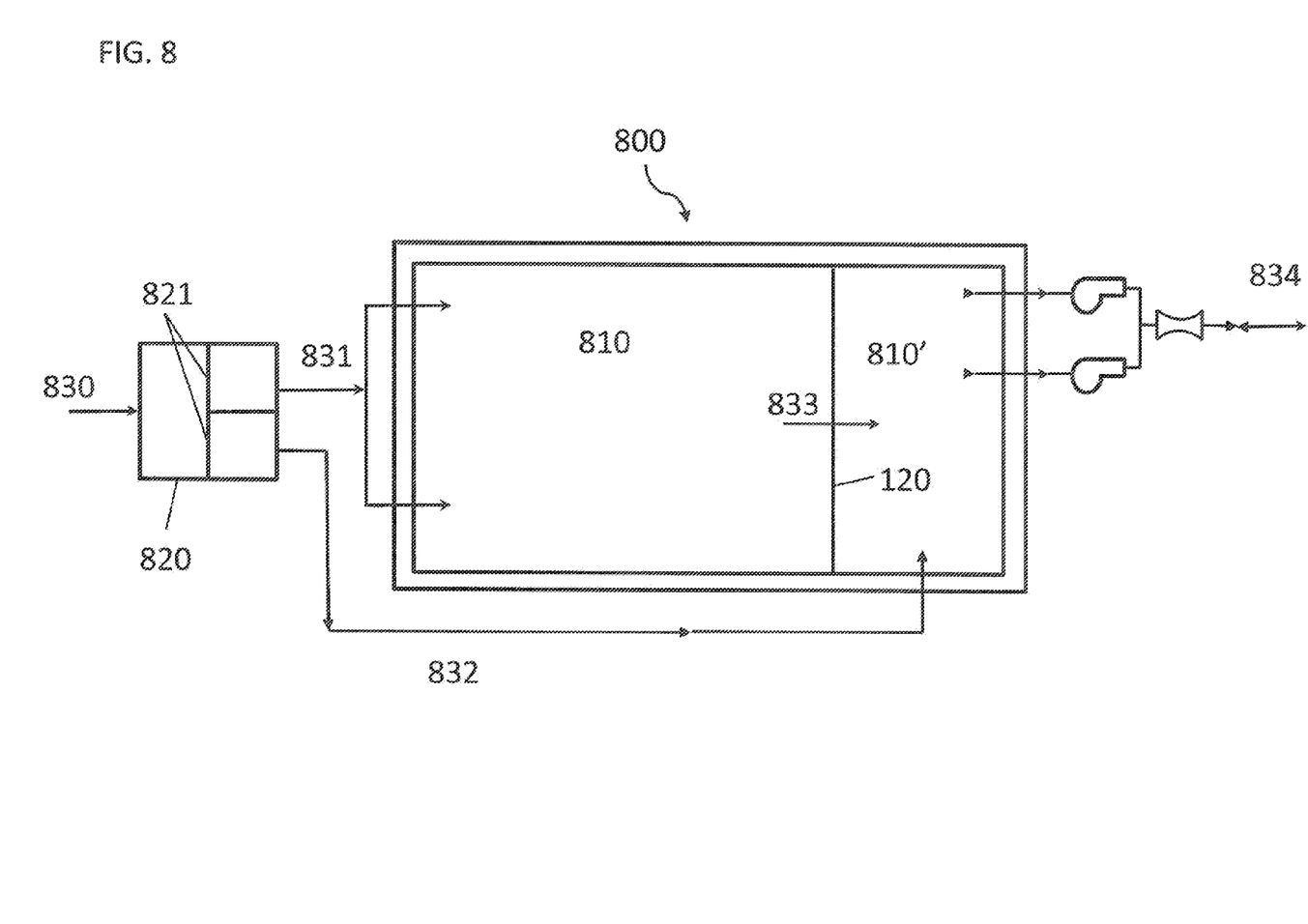
FIG. 8 depicts an anaerobic lagoon 800 including a partitioning element 120 for dividing the interior space of the anaerobic lagoon into two wastewater treatment zones 810 and 810'. The incoming wastewater flow 830 is divided by a flow splitter tank 820 such that flow 831 is conducted to treatment zone 810 and flow 832 is conducted to treatment zone 810'.

The anaerobic lagoon 800 shown in FIG. 8 includes a partitioning element 120, which is, compared to the partitioning element 120 in anaerobic lagoon 100, installed closer to the exit port. As a result, two wastewater treatment zones 810 and 810' are created, wherein the upstream wastewater treatment zone 810 has a larger volume than the downstream wastewater treatment zone 810'. Wastewater is on average retained for a longer period of time in treatment zone 810, which is, therefore, more efficient in removing BOD.

An incoming stream of wastewater 830 is accurately divided by flow-splitter tank 820 into two separate streams, 831 and 832. The respective total amounts and the ratio between divided streams 831 and 832 can be adjusted by positioning flow control slide gates 821, which are provided in the flow-splitter tank 820. Stream 831 is conducted to an intake port of the upstream wastewater treatment zone 810, which is the high-efficiency BOD removal zone and stream 832 is conducted to an intake port of the downstream wastewater treatment zone 810', which is the low-efficiency BOD removal zone. The partitioning element 120 is provided with a plurality of flow holes near the bottom of the lagoon through which a stream of wastewater 833 can flow from the upstream wastewater treatment zone 810 into the downstream wastewater treatment zone 810'. The BOD concentration in the downstream wastewater treatment zone 810' is a function of the relative amounts of streams 832 and 833 entering zone 810', as well as of the retention time of wastewater within this zone. Thus, if a higher BOD concentration in effluent 834 being pumped out of the anaerobic lagoon 800 is desired, a higher inflowing volume of stream 832 is allowed to enter zone 810'.

Figure 9A:
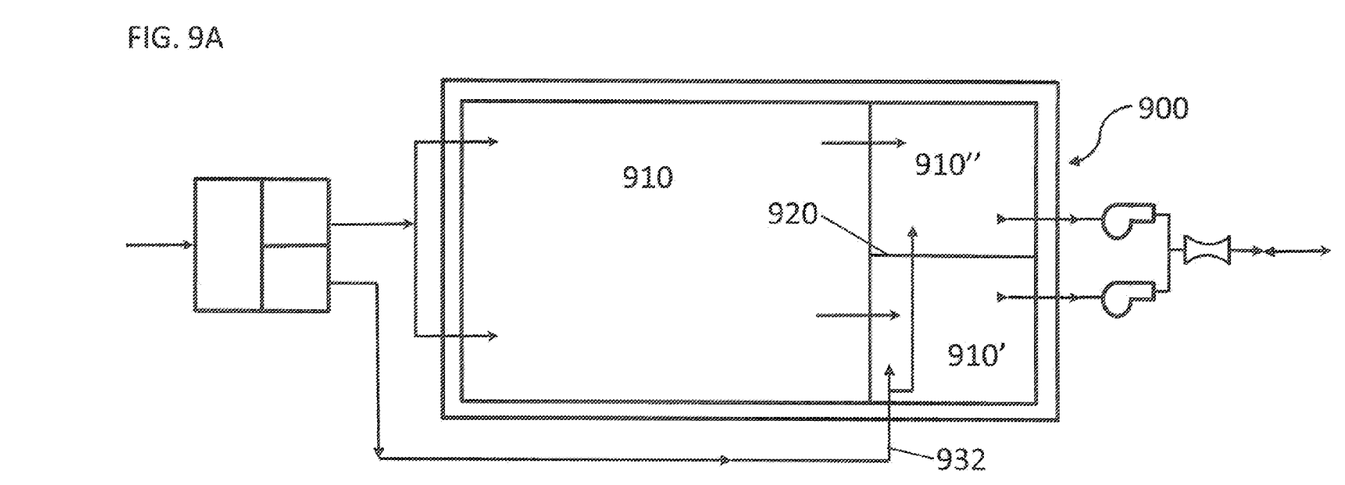
FIG. 9A depicts an anaerobic lagoon 900, which is similar to an anaerobic lagoon 800 but includes an additional partitioning element 930 for providing two low BOD removal efficiency zones 910' and 910" that are arranged in parallel with respect to the flow of wastewater from the high BOD removal efficiency zone 910; and, FIG. 9B depicts an anaerobic lagoon, which is similar to anaerobic lagoon 900 shown in FIG. 9A, except that the additional partitioning element 920 is arranged such that the two low BOD removal efficiency zones 910' and 910" are provided in series with respect to the flow of wastewater from the high BOD removal efficiency zone 910.
Figure 9B:
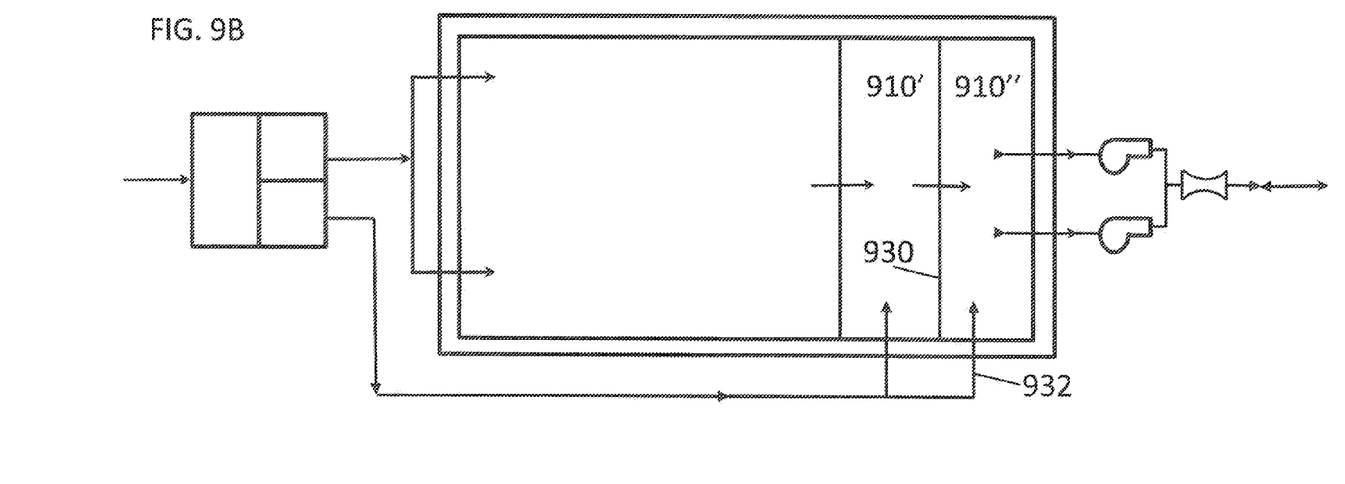

FIGS. 9A and 9B show an anaerobic lagoon in which the downstream wastewater treatment zone is further divided by additional portioning elements 920 and 930, respectively. Specifically, in the anaerobic lagoon 900 of FIG. 9A, partitioning element 920 is provided such that two low-efficiency BOD removal efficiency wastewater treatment zones 910' and 910" are provided in parallel with respect to the main flow of wastewater. Thus, wastewater in which a high percentage of BOD has been removed in wastewater treatment zone 910 flows directly into both wastewater treatment zones 910' and 910". Further, wastewater may enter wastewater treatment zone 910" from wastewater treatment zone 910' through flow holes provided at the bottom of partitioning element 920. By contrast, portioning element 930 in the anaerobic lagoon depicted in FIG. 9B is provided such that two low-efficiency BOD removal efficiency wastewater treatment zones 910' and 910" are provided in series with respect to the main flow of wastewater through the anaerobic lagoon. Accordingly, wastewater in which a high percentage of BOD has been removed in wastewater treatment zone 910 flows first into wastewater treatment zone 910' and subsequently through flow holes provided in partitioning element 930 into wastewater treatment zone 910".

Further, wastewater may be supplied directly to the low-efficiency BOD removal efficiency wastewater treatment zones 910' and 910" by stream 932, regardless whether the zones are provided in parallel (FIG. 9A) or in series (FIG. 9B).

The following examples apply to the embodiments in which the first wastewater treatment zone is larger than the subsequent wastewater treatment zones, such as the embodiments depicted in FIGS. 1, 2, 4, 6, and 7, i.e., an anaerobic lagoon wastewater treatment systems having partitioning elements closer to the main intake port, as well as to anaerobic lagoon wastewater treatment systems comprising a plurality of anaerobic lagoons. Specifically, the following examples describe the wastewater treatment process for an anaerobic lagoon system having a first low BOD removal efficiency wastewater treatment zone and a final high BOD removal efficiency wastewater treatment zone, which may be provided as separate partitions in a common lagoon or as two separate lagoons.

As noted above, the average wastewater detention time in the first wastewater treatment zone is reduced compared to the detention time in the final wastewater treatment zone. For example, if the detention time in the final wastewater treatment zone is about 10 days, than the detention time in the first wastewater treatment zone is selected to be about 1 day, which provides for good fat, oil, and grease (FOG) removal, but removes less soluble and/or colloidal BOD. Accordingly, the effluent from the first wastewater treatment zone has significantly reduced FOG and TSS concentrations, but only a slightly reduced BOD concentration. Further, the effluent from the first wastewater treatment zone has a much higher ratio of carbonaceous oxygen demand (COD) to nitrogen (COD/nitrogen ratio) and BOD/nitrogen ratio; as well as BOD/phosphorous ratio (carbon/phosphorous or C/P ratio) than the final effluent discharged from the outlet end of the final wastewater treatment zone.

Example 1

In the first Example, wastewater having the following initial pollutant concentrations of 2,000 mg/L BOD, 600 mg/L FOG, 1,500 mg/L TSS, 140 mg/L TKN, and 17 mg/L total phosphorous (TP), which is conducted into a first wastewater treatment zone, will typically undergo 20 to 30% reduction in BOD concentration. Thus, alongside a 30% BOD reduction to 1,400 mg/L, the other pollutants are reduced to approximately 200 mg/L or less FOG, 300 to 400 mg/L TSS, 140 mg/L TKN, and 17 mg/L TP. A certain volume of wastewater can then be discharged out of the first wastewater treatment zone and blended with wastewater discharged from the outlet end of the final wastewater treatment zone to produce a blended wastewater or mixture with adequately high C/N and C/P ratios for a downstream activated sludge treatment process to achieve excellent enhanced biological phosphorous removal and nitrogen removal by nitrification-denitrification.

A BOD/N (C/N) ratio of at least 4/1 and a BOD/P (C/P) ratio of at least 20/1 are required to achieve high efficiency nitrogen removal by nitrification-denitrification and enhanced biological phosphorous removal by luxury uptake, respectively. Accordingly, for Example 1 having TKN=140 mg/L and TP=17 mg/L, a BOD concentration of 4(140 mg/L)+20(17 mg/L)=900 mg/L or more is required to achieve or exceed the 4:1 C/N ratio plus the 20:1 C/P ratio.

Comparative Example

If wastewater having the initial pollutant concentrations of Example 1 is treated in an anaerobic lagoon with a single wastewater treatment zone for 10 days, the AL will provide approximately 80% BOD removal, i.e., will result in wastewater having 20% of the initial BOD concentration. Accordingly, the BOD concentration will be reduced from 2,000 mg/L to 0.2(2,000 mg/L)=400 mg/L, which is well below the 900 mg/L BOD concentration required for a BOD/N ratio of at least 4/1 plus a BOD/P ratio of at least 20/1 in the downstream treatment. This significantly lower effluent BOD concentration will provide very poor C/N and excessively low C/P ratios for biological nitrogen and phosphorous removal.

Returning to Example 1, the first wastewater treatment zone achieves FOG and TSS reduction, which is desired upstream of a biological nitrogen and phosphorous removal process while allowing for an adequately high BOD concentration as the organic carbon food source required by the downstream activated sludge process bacteria to achieve efficient nitrogen and phosphorous removal. The final wastewater treatment zone either provides further BOD, FOG, and TSS reduction, or, if required, further wastewater fermentation to break down the wastewater BOD organic carbon source into short chain volatile fatty acids (SCVFAs), which is the carbon food source for the bacteria that achieve enhanced biological phosphorous removal by luxury uptake in the downstream activated sludge process.

For an anaerobic lagoon treatment system designed and operated to provide equalized flow at the outlet end, the following applies. If the wastewater influent flow volume is 1,000,000 gallons per day and the facility is in operation 5 days per week, wastewater is allowed to flow out or is pumped out at a rate of 5,000,000 gallons/7 days=715,000 gallons per day or 500 gallons per minute (gpm). Thus, to provide an anaerobic lagoon effluent mixture with a C/N ratio of 4/1 plus C/P ratio of 20/1, the effluent mixture BOD concentration must be approximately 4×TKN concentration+20×TP concentration. Accordingly, high BOD wastewater must be provided from the first wastewater treatment zone at an adequate flow rate and mixed with low BOD wastewater from the outlet end of the final wastewater treatment zone.

As described above, for a wastewater influent having the pollutant concentrations of Example 1, the BOD concentrations are approximately 0.7(2,000 mg/L)=1,400 mg/L for an effluent from the first wastewater treatment zone and 0.2(2,000 mg/L)=400 mg/L for an effluent from the second wastewater treatment zone. Accordingly, mixing the effluents from the first wastewater treatment zone and the final wastewater treatment zone in equal amounts will result in a mixture having approximately ((1,400 mg/L BOD+400 mg/L BOD)/2)=900 mg/L BOD, TKN=140 mg/L, TP=17 mg/L, and, therefore, a C/N ratio of 4/1 plus a C/P ratio of 20/1.

Example 2

For wastewater having a higher initial BOD concentration of 2,500 mg/L and identical concentrations for TKN=140 mg/L and TP=17 mg/L and analogous process parameters, the relative amounts of effluent from the first wastewater treatment zone and the final wastewater treatment zone have to be adjusted as follows to maintain a C/N ratio of 4/1 and a C/P ratio of 20/1.

The BOD concentration in the effluent from the first wastewater treatment zone is reduced to 0.8(2,500 mg/L BOD)=2,000 mg/L BOD and the effluent from the final wastewater treatment zone is reduced to 0.2(2,500 mg/L BOD)=500 mg/L BOD. Accordingly, the mixture prepared downstream of the anaerobic lagoon treatment system requires the following relative amounts of first and final effluents for a 900 mg/L BOD concentration: x(2,000 mg/L)+(1−x)(500 mg/L)=900 mg/L−x=4/15=0.267.

Thus, approximately 26.7% of the total effluent flow volume must be taken from the first wastewater treatment zone and 100%−26.7%=73.3% must be taken from the final wastewater treatment zone. Further, for a total equalized flow rate of 500 gpm, a flow rate of 0.267(500 gpm)=133.5 gpm for the first effluent and a flow rate of 0.733(500 gpm)=366.5 gpm of the second wastewater treatment zone final effluent should be chosen.

The BOD concentrations and percentages of volume of the effluents downstream of the anaerobic lagoon system for the Examples in accordance with the disclosure and comparative Examples are summarized in Table 1 below.

TABLE 1

| | First BOD concentration [mg/L] | Second BOD concentration [mg/L] | Effluent, volume [%] | Final BOD concentration [mg/L] |
|---|---|---|---|---|
| Example 1 | 1,400 | 400 | 50/50 | 900 |
| Example 2 | 2,000 | 500 | 26.7/73.3 | 900 |
| Comparative Example | n/a | 400 | —/100 | 400 |

Table 1 shows the BOD concentrations of an effluent from the first wastewater treatment zone (First BOD concentration) and of an effluent from the second wastewater treatment zone and the final blended effluent (Final BOD concentration) along with the relative volumes required to maintain the predetermined ratio of 900 mg/L of BOD by mixing the two effluents. Further, Table 1 shows, where applicable, the corresponding values of the Comparative Example.

In the embodiments in which the upstream wastewater treatment zone is larger than the downstream wastewater treatment zone, such as the exemplary embodiments depicted in FIGS. 8, 9A, and 9B, similar calculations to the ones above can be made to determine the final BOD concentration of an effluent from the anaerobic lagoon. However, in this case it has to be taken into account that the final BOD concentration is adjusted by varying the relative amount of wastewater added from the flow-splitter to the final wastewater treatment zone rather than by mixing two partially treated streams of wastewater from different parts of an anaerobic lagoon or from different anaerobic lagoons.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. An anaerobic lagoon wastewater treatment system comprising:
   an anaerobic lagoon;
   a partition element positioned within the anaerobic lagoon to define a high biological oxygen demand (BOD) removal efficiency wastewater treatment zone and a low BOD removal efficiency wastewater treatment zone; and
   a flow splitter tank;
   wherein the flow splitter tank divides a flow of raw wastewater into a first wastewater flow being conducted to the high BOD removal efficiency wastewater treatment zone and a second wastewater flow being conducted to the low BOD removal efficiency wastewater treatment zone, and
   wherein the high BOD removal efficiency wastewater treatment zone has a larger volume than the low BOD removal efficiency wastewater treatment zone.

2. The system according to claim 1, wherein the low BOD removal efficiency wastewater treatment zone is located adjacent to an exit port of the anaerobic lagoon.

3. The system according to claim 1, wherein the partition element has a plurality of flow holes in a vicinity of a lagoon bottom so that a liquid level is essentially the same on both sides of the partition element.

4. The system according to claim 3, wherein wastewater flows from the high BOD removal efficiency wastewater treatment zone through the plurality of flow holes into the low BOD removal efficiency wastewater treatment zone.

5. The system according to claim 1, further comprising a biogas containment cover.

6. The system according to claim 1, comprising one partition element.

7. The system according to claim 1, comprising a further partition element dividing the low BOD removal efficiency wastewater treatment zone into a first low BOD removal efficiency wastewater treatment zone and a second low BOD removal efficiency wastewater treatment zone.

8. The system according to claim 7, wherein the first low BOD removal efficiency wastewater treatment zone and the second low BOD removal efficiency wastewater treatment zone are connected in series.

9. The system according to claim 7, wherein the first low BOD removal efficiency wastewater treatment zone and the second low BOD removal efficiency wastewater treatment zone are connected in parallel.

10. A method of controlling an effluent carbon to nitrogen ratio of an anaerobic lagoon, comprising:
    providing an anaerobic lagoon;
    positioning a partition element within the anaerobic lagoon to define a high biological oxygen demand (BOD) removal efficiency wastewater treatment zone and a low BOD removal efficiency wastewater treatment zone;
    dividing a wastewater influent in a flow splitter tank into a first wastewater flow and a second wastewater flow; and,
    conducting the first wastewater flow into the high BOD removal efficiency wastewater treatment zone and the second wastewater flow into the low BOD removal efficiency wastewater treatment zone to adjust a ratio of effluent carbon to nitrogen at an exit port of the anaerobic lagoon,
    wherein the high BOD removal efficiency wastewater treatment zone has a larger volume than the low BOD removal efficiency wastewater treatment zone.

11. The method according to claim 10, further comprising:
    adjusting a ratio of the first wastewater flow to the second wastewater flow to maintain a predetermined ratio of effluent carbon to nitrogen at the exit port of the anaerobic lagoon.

12. The method according to claim 11, wherein the predetermined ratio of effluent carbon to nitrogen is at least 4:1.

13. The method according to claim 11, wherein a ratio of effluent carbon to phosphorus at the exit port of the anaerobic lagoon is at least 20:1.

14. The method according to claim 11, wherein a ratio of effluent carbon to nitrogen is at least 4:1 plus a ratio of effluent carbon to phosphorous is at least 20:1.

15. The method according to claim 10, further comprising:
    providing a plurality of flow holes in a vicinity of a lagoon bottom.

16. The method according to claim 10, further comprising:
    providing a first wastewater detention time for the high BOD removal efficiency wastewater treatment zone and a final wastewater detention time for the low BOD removal efficiency wastewater treatment zone, wherein the first wastewater detention time is about four to ten times longer than the final wastewater detention time.

17. The method according to claim 16, wherein the first wastewater detention time is about two days to twenty days and the final wastewater detention time is about twelve hours to two days.

18. The method according to claim 10, further comprising:
    reducing the BOD concentration of the wastewater in the high BOD removal efficiency wastewater treatment zone by about 70% to 80%.

* * * * *